United States Patent [19]

Yanagita et al.

[11] Patent Number: 5,246,892

[45] Date of Patent: Sep. 21, 1993

[54] FARADAY ROTATION GLASS

[75] Inventors: Hiroaki Yanagita, Hino; Hisayoshi Toratani, Tokyo; Tomoko Kasuga, Akishima, all of Japan

[73] Assignee: Hoya Corporation, Tokyo, Japan

[21] Appl. No.: 902,028

[22] Filed: Jun. 22, 1992

[30] Foreign Application Priority Data

Jun. 26, 1991 [JP] Japan .................................. 3-154925

[51] Int. Cl.$^5$ ................................................ C03C 3/16
[52] U.S. Cl. ........................................ 501/45; 501/46; 501/47; 501/48
[58] Field of Search ........................ 501/45, 46, 47, 48

[56] References Cited

U.S. PATENT DOCUMENTS

| 4,075,120 | 2/1978 | Myers et al. | 501/48 X |
| 4,165,989 | 8/1979 | Asahara | 501/48 |
| 4,875,920 | 10/1989 | Myers | 501/45 |

*Primary Examiner*—Karl Group
*Attorney, Agent, or Firm*—Nixon & Vanderhye

[57] ABSTRACT

Faraday rotation glass having a practically sufficiently large Verdet's constant, which contains 60 to 75 mol % of $P_2O_5$, 10 to 20 mol % of $Tb_2O_3$ and 10 to 25 mol % of $K_2O$ and having substantially no platinum inclusion.

9 Claims, No Drawings

FARADAY ROTATION GLASS

FIELD OF THE INVENTION

The present invention relates to Faraday rotation glass having a practically sufficiently large Verdet's constant and having no platinum inclusion. The Faraday rotation glass of the present invention is used particularly in a laser optical system for a large output.

PRIOR ART

When linear-polarized light passes through a transparent substance placed in a magnetic field, the plane of polarization of the light rotates, which phenomenon has been known as a Faraday effect. This effect is used for an optical isolator which passes light unidirectionally. It has been known that glass having a large content of a paramagnetic rare earth oxide has a large Verdet's constant and that particularly a terbium oxide ($Tb_2O_3$) is the most effective component for Faraday rotation glass due to the absence of specific absorption in visible and near infrared bands.

Meanwhile, for the production of a glass material for use in a laser optical system for a large output, a platinum crucible is inevitably used for melting the glass for the following reasons.

That is, a glass material used in a laser optical system for a large output is required to have high homogeneity. When the glass homogeneity is low, there are caused serious problems that laser light is scattered and that the focusing property decreases due to fluctuation of the intensity and disorder of the mode. In order to obtain glass having high homogeneity, it is at least indispensable to sufficiently stir a molten glass in a platinum crucible at a final melting stage prior to the molding of the glass. The reason therefor is that, when a silica glass crucible or a clay crucible is used at the step for the homogeneity, a molten glass corrodes the crucible during the melting step and components as materials of the crucible are included in the glass to form striae. Therefore, no high homogeneity can be obtained. For this reason, a silica glass crucible or a clay crucible may be used at a step of forming a preliminary glass from a glass material batch, but it is required to use a platinum crucible in final melting to obtain glass having high homogeneity.

When Faraday rotation glass is used as an optical isolator material in a nuclear fusion laser optical system for a large output, not only the Verdet's constant is required to be large, but also it is required not to cause the presence of a foreign matter of platinum coming from the crucible during the melting, so-called a platinum inclusion. That is because the platinum inclusion in the glass causes the following serious problems in practical use. When the glass having a platinum inclusion is irradiated with laser light having high intensity, the platinum inclusion absorbs the laser light and heat is locally generated to cause a thermal stress. Therefore, cracking starts there to cause damage on the glass. Due to the damage, the laser light is scattered, the output is greatly decreased, and disorder of the laser mode is caused. Due to the disorder of the laser mode, the focusing property is deteriorated, and laser light cannot be focused on an intended portion.

As an optical isolator material for use in a nuclear fusion laser optical system for a large output, several types of Faraday rotation glass have been developed. For example, Japanese Patent Publication No. 3306/1980 (U.S. Pat. No. 4,165,989) discloses a terbium-phosphate glass composed of 5 to 25 mol % of $Tb_2O_3$, 55 to 75 mol % of $P_2O_5$, 5 to 25 mol % of $B_2O_3$, 0 to 15 mol % of $Al_2O_3$ and 5 to 25 mol % of $K_2O + MgO$ (0 to 25 mol % of $K_2O$ and 0 to 15 mol % of MgO).

In order to avoid the formation of the platinum inclusion in the glass, the glass is required to have high solubility for platinum, and the temperature necessary for melting the glass is required to be low. Namely, as the solubility for platinum increases, platinum dissolved during the melting can be retained in an ionic state to a greater extent so that it hardly precipitates as an inclusion. Further, as the melting temperature becomes lower, the vapor pressure of platinum becomes lower so that the dissolution of platinum in a molten glass is prevented, which therefore leads to less amount of platinum in the glass during the melting.

However, the terbium-phosphate glass disclosed in Japanese Patent Publication No. 3306/1980 (U.S. Pat. No. 4,165,989) has the following defect: Since it contains a large amount, as large as 5 to 25 mol %, of $B_2O_3$ for stabilizing the glass, a very high melting temperature of 1,300° to 1,400° C. is required to achieve the homogeneity of the glass. For this reason, the amount of platinum included in the glass increases, and the solubility of platinum in the glass decreases. Therefore the platinum inclusion is unavoidable.

SUMMARY OF THE INVENTION

It is an object of the present invention to provide Faraday rotation glass having a practically sufficiently large Verdet's constant and substantially having no platinum inclusion.

The present invention has been made to achieve the above object, and according to the present invention, there is provided Faraday rotation glass containing 60 to 75 mol % of $P_2O_5$, 10 to 20 mol % of $Tb_2O_3$ and 10 to 25 mol % of $K_2O$ and substantially having no platinum inclusion.

DETAILED DESCRIPTION OF THE INVENTION

In the Faraday rotation glass of the present invention, the proportions of the components are defined as described above for the following reasons.

$P_2O_5$ is an essential component as glass network-forming oxide to form the glass. In no cases when the amount thereof is less than 60 mol % and when it is more than 75 mol %, a homogeneous glass containing no crystal is obtained. The proportion of $P_2O_5$ is therefore limited to 60 to 75 mol %. Its proportion is particularly preferably 65 to 70 mol %.

$Tb_2O_3$ is indispensable as a paramagnetic oxide to increase the Veldet's constant. With an increase in its proportion, the Veldet's constant increases. When the proportion thereof exceeds 20 mol %, the glass tends to be unstable. At the same time, the melting temperature increases, and a platinum inclusion is liable to precipitate. As a result, the features of the present invention are liable to be impaired. Further, when it is less than 10 mol %, the resultant glass has too small a Verdet's constant and is insufficient for many applications. Therefore, the proportion of $Tb_2O_3$ is therefore limited to 10 to 20 mol %. Its proportion is particularly preferably 15 to 17.5 mol %.

$K_2O$ is an essential component to form the glass. In no cases when its proportion is less than 10 mol % and when it is more than 25 mol %, a homogeneous glass is obtained. Therefore, the proportion of $K_2O$ is limited to 10 to 25 mol %. Its proportion is particularly preferably 15 to 20 mol %.

According to the present invention, part of $K_2O$ can be replaced with at least one of $Li_2O$, $Na_2O$ and $Cs_2O$. That is, the proportion of $Li_2O$ is 0 to 15 mol %, the proportion of $Na_2O$ is 0 to 15 mol %, the proportion of $Cs_2O$ is 0 to 15 mol % and the total amount of $Li_2O$, $Na_2O$, $K_2O$ and $Cs_2O$ is 10 to 25 mol %. The total amount of these components is particularly preferably 15 to 20 mol %. Even in this case, the proportion of $K_2O$ is also at least 10 mol %.

Further, according to the present invention, part of $K_2O$ may be replaced with at least one of $Li_2O$, $Na_2O$, $Cs_2O$, MgO, CaO, SrO, BaO, PbO, $WO_3$, $Nb_2O_5$, $SiO_2$, $GeO_2$ and $B_2O_3$. That is, the proportion of $Li_2O$ is 0 to 15 mol %, the proportion of $Na_2O$ is 0 to 15 mol %, the proportion of $Cs_2O$ is 0 to 15 mol %, the proportion of MgO is 0 to 5 mol %, the proportion of CaO is 0 to 5 mol %, the proportion of SrO is 0 to 5 mol %, the proportion of BaO is 0 to 5 mol %, the proportion of PbO is 0 to 5 mol %, the proportion of $WO_3$ is 0 to 5 mol %, the proportion of $Nb_2O_5$ is 0 to 5 mol %, the proportion of $SiO_2$ is 0 to 1 mol %, the proportion of $GeO_2$ is 0 to 1 mol %, the proportion of $B_2O_3$ is 0 to 1 mol %, and the total amount of $Li_2O$, $Na_2O$, $K_2O$, $Cs_2O$, MgO, CaO, SrO, BaO, PbO, $WO_3$, $Nb_2O_5$, $SiO_2$, $GeO_2$ and $B_2O_3$ is 10 to 25 mol %. The total amount of these components is particularly preferably 15 to 20 mol %. Even in this case, the proportion of $K_2O$ is also at least 10 mol %.

The Faraday rotation glass of the present invention may also contain 1 to 4 mol % of $Al_2O_3$. Due to this, such glass containing a large amount of $Tb_2O_3$ as the glass provided by the present invention can be improved in the stability against crystallization. The reason is that when $Al^{3+}$ having high field strength ($Z/a^2$ in which Z is the valence of cation and a is the radius of cation) is incorporated into a phosphate glass in which $PO_4$ tetrahedrons as a glass network-forming component are mutually bonded in a chain form and entangle themselves, the glass structure is tightened, and the network is therefore strengthened.

However, when the proportion of $Al_2O_3$ is less than 1 mol %, there is little effect on improvement in the stability against crystallization. When it exceeds 4 mol %, the stability against crystallization deteriorates, the temperature for melting the glass increases, and glass substantially having no platinum inclusion is no longer obtained. The proportion of $Al_2O_3$ is particularly preferably 2 to 3 mol %.

The Faraday rotation glass of the present invention has a characteristic feature in that it substantially has no platinum inclusion. The wording "substantially having no platinum inclusion" here means not only a case where no platinum inclusion is contained but also a case where a platinum inclusion is contained to such an extent that the glass is not damaged even under irradiation with high-intensity laser light. For example, in Faraday rotation glass for a nuclear fusion laser optical system, the criterion is that the number of platinum inclusions having a diameter of 10 $\mu m$ or less is 1 or less per 2 liters of the glass (0.5 or less per liter). In other words, when 100 shots of high-intensity laser light having an energy density of about 10 $J/cm^2$ and a pulse width of about 10 nsec enter the glass, the number of damage having a size of 500 $\mu m$ or less is 1 or less per 2 liters of the glass (0.5 or less per liter).

In producing the Faraday rotation glass of the present invention, it is preferred to carry out the melting in a platinum crucible in an oxidizing atmosphere. The oxidizing atmosphere can be achieved by flowing an oxidizing gas along the surface of molten glass in a platinum crucible or by bubbling an oxidizing gas into molten glass in a platinum crucible. The oxidizing gas is selected from $O_2$, $Cl_2$, $POCl_3$, $PCl_3$ and $SOCl_2$.

The present invention will be further explained hereinafter by reference to Examples. However, the present invention shall not be limited to these Examples.

EXAMPLES 1–41

Some of raw materials such as $H_3PO_4$, $K_2CO_3$, $Tb_4O_7$, $Al(OH)_3$, $Li_2CO_3$, $Na_2CO_3$, $Cs_2CO_3$, $MgCO_3$, $CaCO_3$, $SrCO_2$, $BaCO_3$, PbO, $Nb_2O_5$, $WO_3$, $H_3BO_3$, $SiO_2$, $GeO_2$, etc., were weighed out in predetermined amounts and mixed so that 150 g of glass was obtained. The mixture was charged into a platinum crucible with a platinum lid, and melted at 1,200° C. for 2 hours. Then, the molten glass was cast into a graphite mold to shape it into a size of about 50 mm × 35 mm × 15 mm, and was gradually cooled to give Faraday rotation glass in each of Examples 1 to 41. All the so-obtained glass products were homogeneous. The Verdet's constant of each of these glass products was −0.08 to −0.16 min/Oe·cm or practically sufficiently large. When the interiors of these glass products were visually observed under irradiation with a light-focussing lamp, none of the glass products had a foreign matter inside. Further, these glass products were also observed to see whether or not damage occurred by applying high-intensity laser light. This laser irradiation test was carried out by applying laser light having a wavelength of 1.06 $\mu m$, an energy density of 12 to 13 $J/cm^2$, a pulse width of 8 nsec and a beam diameter of 2 mm to each of the samples prepared by cutting the above-obtained glass products to a size of about 35 mm × 35 mm × 15 mm through their surfaces (35 mm × 35 mm) which are free surfaces during the casting. The entire surface of each of the glass products was scanned by irradiating it with 100 shots of the laser light, and then each glass was observed to show that no damage occurred in the glass products of Examples 1 to 41 as shown in Tables 1 to 6. Some of the glass products were also evaluated on their chemical durability (Dw) (weight loss in water according to Japanese Optical Glass Industrial Standards ... powder method, 100° C., 1 hour) to show that the so-evaluated products were all satisfactory.

0.2 Gram of each of the glass products obtained in Examples 2, 5, 17 and 20 was separately dissolved in phosphoric acid ($H_3PO_4$) in a quartz glass test tube to prepare a constant volume of 100 ml, and each of the so-prepared samples was composition-analyzed by plasma emission spectral analysis. As the results are shown in Table 7, these Faraday rotation glass products showed almost no compositional deviation from their batch compositions.

COMPARATIVE EXAMPLES 1–3

For comparison, there were prepared terbium-phosphate glass containing 5 mol % of $B_2O_3$ as a glass sample of Comparative Example 1, terbium-phosphate glass containing 10 mol % of $B_2O_3$ as a glass sample of Comparative Example 2, and terbium-phosphate glass containing 5 mol % of $B_2O_3$ and 5 mol % of $Al_2O_3$ as a glass sample of Comparative Example 3. These glass samples were obtained from $H_3PO_4$, $K_2CO_3$, $Tb_4O_7$, $Al(OH)_3$ and $B_2O_3$ as raw materials in the same manner as in Examples 1 to 41 except that these raw materials melted at 1,300° C., since these raw materials were not homogeneously melted at 1,200° C. and partially remained in the molten glass. When the interiors of these glass products were visually observed under irradiation with a focussing lamp, it was found that many bright points caused by the presence of platinum inclusions were dispersed in the glass interiors. Further, when the laser irradiation test was carried out in the same manner as in Examples 1 to 41, platinum inclusion-caused damages having a size of approximately 300 to 500 μm were found in the interiors of the terbium-phosphate glass samples containing 5 mol % or more of $B_2O_3$ in Comparative Examples 1 and 2 and the terbium-phosphate glass sample containing 5 mol % of $B_2O_3$ and 5 mol % of $Al_2O_3$ in Comparative Example 3. That is, it was found that the numbers of the platinum inclusion-caused damages were 3 in the glass of Comparative Example 1, 8 in the glass of Comparative Example 2 and 16 in the glass of Comparative Example 3. The numbers of the damages induced by the laser irradiation test of the glass samples of Comparative Examples 1, 2 and 3 correspond to about 160/liter, about 440/liter and about 880/liter when calculated in proportion. It has been revealed that terbium-phosphate glass containing 5 mol % or more of $B_2O_3$ or containing 5 mol % or more of each of $B_2O_3$ and $Al_2O_3$ has many platinum inclusions.

EXAMPLES 42 and 43

Raw materials were mixed so as to obtain about 25 kg of glass of Example 42 having the same composition as that of the glass of Example 5 and about 25 kg of glass of Example 43 having the same composition as that of the glass of Example 20, and each of the resultant mixtures was charged into a large-scale platinum furnace (maximum volume 10 liters) kept at 1,100° C. After the mixtures were kept in this state for 6 hours, the temperature of each mixture was elevated up to 1,200° C. with taking about 1 hour. Each mixture was stirred at 1200° C. for 1 hour, and further kept at this temperature for 1 hour. Thereafter, each of the mixtures was temperature-decreased, cast into a cylindrical graphite mold having a diameter of 10.5 cm around 950° C. with stirring to shape them, and gradually cooled to give glass products having a diameter of 10.5 cm and a length of about 85 cm. While melting each mixture, an oxygen gas was flowed into the crucible through a quartz glass tube at a rate of about 5 liters/minute. Fourteen sheets having a diameter of 10.5 cm and a thickness of 4 cm and 3 sheets having a diameter of 10.5 cm and a thickness of 5 cm were taken from each glass product, and both end surfaces of the sheets were optically polished. When these polished glass sheets were subjected to the same laser irradiation test as that in Examples 1 to 41, no damage occurred in any one of the glass sheets. That is, the glass obtained in each of these Examples sufficiently satisfied the conditions required of Faraday rotation glass for a nuclear fusion laser optical system with regard to platinum inclusion.

EXAMPLES 44 AND 45

Raw materials were mixed so as to obtain about 25 kg of glass of Example 44 having the same composition as that of the glass of Example 3 and about 25 kg of glass of Example 45 having the same composition as that of the glass of Example 18, and the resultant mixtures were charged into quartz glass crucibles. The crucibles were placed in an electric furnace at 1,200° C. and kept as they were for 4 hours. Then, in each Example, this molten glass was cast into a stainless steel container of which the outer wall was cooled by wetting it with water, and rapidly cooled to give cullets of Faraday rotation glass. These cullets were charged into a large-scale platinum furnace kept at 1,200° C., and maintained as they were for 1 hour. Thereafter, the molten glass was stirred for 1 hour, and further, allowed to stand for 1 hour. Then, the temperature of the molten glass was decreased, and while it was stirred, it was cast around 950° C. into a cylindrical graphite mold having a diameter of 10.5 cm to shape it. The molten glass was gradually cooled to give glass having a diameter of 10.5 cm and a length of about 85 cm. Seventeen sheets having a diameter of 10.5 cm and a thickness of 4 cm were taken from the glass, and both end surfaces of each sheet were optically polished. When these polished glass sheets were subjected to the same laser irradiation test as that in Examples 1 to 41, no damage occurred in any one of the glass sheets. That is, the glass obtained in each of these Examples sufficiently satisfied the conditions required of Faraday rotation glass for a nuclear fusion laser optical system with regard to platinum inclusion.

COMPARATIVE EXAMPLE 4

Raw materials were mixed so as to obtain about 25 kg of glass having the same composition as that of the glass of Comparative Example 2, and the mixture was charged into a quartz glass crucible. The crucible was placed in an electric furnace at 1,350° C., and kept for 3 hours as it was. Then, the resultant molten glass was taken out of the furnace, and it was cast into a stainless steel container of which the outer wall was cooled by wetting it with water, and rapidly cooled to give cullets of Faraday rotation glass. These cullets were transferred into a large-scale platinum furnace kept at 1,300° C., and maintained for 1 hour as they were. Thereafter, the molten glass was stirred for 1 hour, and further, allowed to stand for 1 hour. Then, the temperature of the molten glass was decreased, and while it was stirred, it was cast around 1,050° C. into a cylindrical graphite mold having a diameter of 10.5 cm to shape it. The molten glass was gradually cooled to give glass having a diameter of 10.5 cm and a length of about 85 cm. Seventeen sheets having a diameter of 10.5 cm and a thickness of 4 cm were taken from the glass, and both end surfaces of each sheet were optically polished. Then, these sheets were subjected to the same laser irradiation test as that in Examples 1 to 41. As a result, damage occurred in all the sheets. The damage size ranged from about 200 μm to about 500 μm. And, the minimum number of the damages was 3, the maximum number thereof was 21, and the average number thereof was about 19. These figures correspond to about 9/liter, about 60/liter and about 55/liter. It has been revealed that terbium-phosphate glass containing 5 mol % or more of $B_2O_3$ has a very large number of platinum inclusions.

TABLE 1

| No. | Example 1 | 2 | 3 | 4 | 5 | 6 | 7 | 8 | 9 |
|---|---|---|---|---|---|---|---|---|---|
| $P_2O_5$ (mol %) | 65 | 60 | 65 | 70 | 65 | 75 | 70 | 75 | 65 |
| $Tb_2O_3$ | 20 | 20 | 17.5 | 15 | 15 | 10 | 10 | 15 | 10 |
| $K_2O$ | 15 | 20 | 17.5 | 15 | 20 | 15 | 20 | 10 | 25 |
| V (min/Oe · cm) | −0.16 | −0.16 | −0.14 | −0.12 | −0.12 | −0.08 | −0.08 | −0.12 | −0.08 |
| Dw (wt %) | — | 0.042 | — | — | 0.085 | — | — | — | — |
| Number of damages in laser irradiation test | 0 | 0 | 0 | 0 | 0 | 0 | 0 | 0 | 0 |

TABLE 2

| No. | Example 10 | 11 | 12 | 13 | 14 | 15 |
|---|---|---|---|---|---|---|
| $P_2O_5$ (mol %) | 65 | 65 | 65 | 65 | 65 | 65 |
| $Tb_2O_3$ | 15 | 15 | 15 | 15 | 15 | 15 |
| $K_2O$ | 10 | 10 | 10 | 15 | 15 | 19 |
| $Li_2O$ | 10 | | | | | |
| $Na_2O$ | | 10 | | | | |
| $Cs_2O$ | | | 10 | | | |
| BaO | | | | 5 | | |
| $WO_3$ | | | | | 5 | |
| $B_2O_3$ | | | | | | 1 |
| V (min/Oe · cm) | −0.12 | −0.12 | −0.11 | −0.11 | −0.11 | −0.12 |
| Dw (wt %) | 0.065 | 0.07 | — | 0.06 | 0.06 | 0.07 |
| Number of damages in laser irradiation test | 0 | 0 | 0 | 0 | 0 | 0 |

TABLE 3

| No. | Example 16 | 17 | 18 | 19 | 20 | 21 | 22 | 23 | 24 |
|---|---|---|---|---|---|---|---|---|---|
| $P_2O_5$ (mol %) | 64 | 60 | 64 | 69 | 63.5 | 75 | 68 | 74 | 62 |
| $Tb_2O_3$ | 20 | 20 | 17.5 | 15 | 15 | 10 | 10 | 14 | 10 |
| $K_2O$ | 14 | 19 | 16 | 15 | 19 | 11 | 20 | 10 | 25 |
| $Al_2O_3$ | 2 | 1 | 2.5 | 1 | 2.5 | 4 | 2 | 2 | 3 |
| V (min/Oe · cm) | −0.16 | −0.16 | −0.14 | −0.12 | −0.12 | −0.08 | −0.08 | −0.11 | −0.08 |
| Dw (wt %) | — | 0.042 | — | — | 0.08 | — | — | — | — |
| Number of damages in laser irradiation test | 0 | 0 | 0 | 0 | 0 | 0 | 0 | 0 | 0 |

TABLE 4

| No. | Example 25 | 26 | 27 | 28 | 29 | 30 | 31 |
|---|---|---|---|---|---|---|---|
| $P_2O_5$ (mol %) | 64 | 62.5 | 62.5 | 64 | 62 | 64 | 63 |
| $Tb_2O_3$ | 15 | 15 | 15 | 15 | 15 | 15 | 15 |
| $K_2O$ | 10 | 15 | 10 | 14 | 10 | 14 | 14 |
| $Al_2O_3$ | 1 | 2.5 | 2.5 | 2 | 3 | 2 | 3 |
| $Li_2O$ | 10 | | | | | | |
| $Na_2O$ | | 5 | 10 | | | | |
| $Cs_2O$ | | | | 5 | 10 | | |
| MgO | | | | | | 5 | |
| CaO | | | | | | | 5 |
| SrO | | | | | | | |
| BaO | | | | | | | |
| PbO | | | | | | | |
| $B_2O_3$ | | | | | | | |
| $GeO_2$ | | | | | | | |
| $SiO_2$ | | | | | | | |
| $Nb_2O_5$ | | | | | | | |
| $WO_3$ | | | | | | | |
| V (min/Oe · cm) | −0.12 | −0.12 | −0.11 | −0.11 | −0.11 | −0.11 | −0.11 |
| Dw (wt %) | 0.065 | 0.07 | — | — | — | — | 0.06 |
| Number of damages in laser irradiation test | 0 | 0 | 0 | 0 | 0 | 0 | 0 |

TABLE 5

| No. | Example 32 | 33 | 34 | 35 | 36 | 37 | 38 |
|---|---|---|---|---|---|---|---|
| $P_2O_5$ (mol %) | 64 | 63 | 63 | 63 | 64 | 63 | 63.5 |
| $Tb_2O_3$ | 15 | 15 | 15 | 15 | 15 | 15 | 15 |
| $K_2O$ | 14 | 14 | 15 | 18 | 18 | 18 | 15 |
| $Al_2O_3$ | 2 | 3 | 2 | 3 | 2 | 3 | 1.5 |
| $Li_2O$ | | | | | | | |
| $Na_2O$ | | | | | | | |
| $Cs_2O$ | | | | | | | |
| MgO | | | | | | | |

TABLE 5-continued

| No. | Example | | | | | | |
|---|---|---|---|---|---|---|---|
| | 32 | 33 | 34 | 35 | 36 | 37 | 38 |
| CaO | | | | | | | |
| SrO | 5 | | | | | | |
| BaO | | 5 | | | | | |
| PbO | | | 5 | | | | |
| B₂O₃ | | | | 1 | | | |
| GeO₂ | | | | | 1 | | |
| SiO₂ | | | | | | 1 | |
| Nb₂O₅ | | | | | | | 5 |
| WO₃ | | | | | | | |
| V (min/Oe · cm) | −0.10 | −0.12 | −0.12 | −0.11 | −0.12 | −0.12 | −0.11 |
| Dw (wt %) | — | 0.05 | 0.06 | 0.04 | — | — | — |
| Number of damages in laser irradiation test | 0 | 0 | 0 | 0 | 0 | 0 | 0 |

TABLE 6

| No. | Example | | | Comparative Example | | | |
|---|---|---|---|---|---|---|---|
| | 39 | 40 | 41 | 1 | 2 | 3 | 4 |
| P₂O₅ (mol %) | 63.5 | 63 | 64 | 75 | 65 | 65 | 65 |
| Tb₂O₃ | 15 | 15 | 16.5 | 10 | 15 | 15 | 15 |
| K₂O | 15 | 18 | 17.5 | 10 | 10 | 10 | 10 |
| Al₂O₃ | 1.5 | 4 | 2 | 10 | 10 | | |
| Li₂O | | | | | | 5 | |
| Na₂O | | | | | | | |
| Cs₂O | | | | | | | |
| MgO | | | | | | | |
| CaO | | | | | | | |
| SrO | | | | | | | |
| BaO | | | | | | | |
| PbO | | | | | | | |
| B₂O₃ | | | | 5 | 10 | 5 | 10 |
| GeO₂ | | | | | | | |
| SiO₂ | | | | | | | |
| Nb₂O₅ | | | | | | | |
| WO₃ | 5 | | | | | | |
| V (min/Oe · cm) | −0.11 | −0.11 | −0.13 | −0.08 | −0.12 | −0.12 | −0.12 |
| Dw (wt %) | 0.06 | 0.05 | 0.06 | — | — | — | — |
| Number of damages in laser irradiation test | 0 | 0 | 0 | 3 | 8 | 16 | 315* |

*Number of damages in total, observed concerning 17 samples

TABLE 7

| | P₂O₅ | K₂O | Tb₂O₃ | Al₂O₃ |
|---|---|---|---|---|
| Example 2 | | | | |
| Batch composition | 60 | 20 | 20 | — |
| Found | 60.4 | 19.0 | 20.6 | — |
| Example 5 | | | | |
| Batch composition | 65 | 20 | 15 | — |
| Found | 65.4 | 19.2 | 15.4 | — |
| Example 17 | | | | |
| Batch composition | 60 | 19 | 20 | 1 |
| Found | 60.4 | 18.0 | 20.6 | 1.0 |
| Example 20 | | | | |
| Batch composition | 63.5 | 19 | 15 | 2.5 |
| Found | 63.9 | 18.2 | 15.4 | 2.5 |

As described above, according to the present invention, there can be provided Faraday rotation glass having a practically sufficiently large Verdet's constant and having no platinum inclusion, and the Faraday rotation glass of the present invention can be desirably used as Faraday rotation glass which is required to have high homogeneity for a nuclear fusion laser optical system.

What is claimed is:

1. A Faraday rotation glass containing 60 to 75 mol % of $P_2O_5$, 10 to 20 mol % of $Tb_2O_3$, 10 to 25 mol % of $K_2O$ and 0 to 1 mol % $B_2O_3$ and substantially having no platinum inclusion.

2. A Faraday rotation glass according to claim 1, which further contains at least one member of $Li_2O$, $Na_2O$ and $Cs_2O$ with the proviso that $Li_2O$ is contained in an amount of 0 to 15 mol %, $Na_2O$ is contained in an amount of 0 to 15 mol %, $Cs_2O$ is contained in an amount of 0 to 15 mol % and the total amount of $Li_2O$, $Na_2O$, $K_2O$ and $Cs_2O$ is 10 to 25 mol %.

3. A Faraday rotation glass according to claim 1, which further contains at least one member of $Li_2O$, $Na_2O$, $Cs_2O$, MgO, CaO, SrO, BaO, PbO, $WO_3$, $Nb_2O_5$, $SiO_2$, $GeO_2$ and $B_2O_3$ provided that $Li_2O$ is contained in an amount of 0 to 15 mol %, $Na_2O$ is contained in an amount of 0 to 15 mol %, $Cs_2O$ is contained in an amount of 0 to 15 mol %, MgO is contained in an amount of 0 to 5 mol %, CaO is contained in an amount of 0 to 5 mol %, SrO is contained in an amount of 0 to 5 mol %, BaO is contained in an amount of 0 to 5 mol %, PbO is contained in an amount of 0 to 5 mol %, $WO_3$ is contained in an amount of 0 to 5 mol %, $Nb_2O_5$ is contained in an amount of 0 to 5 mol %, $SiO_2$ is contained in an amount of 0 to 1 mol %, $GeO_2$ is contained in an amount of 0 to 1 mol %, and the total amount of $Li_2O$, $Na_2O$, $K_2O$, $Cs_2O$, MgO, CaO, SrO, BaO, PbO, $WO_3$, $Nb_2O_5$, $SiO_2$, $GeO_2$ and $B_2O_3$ is 10 to 25 mol %.

4. A Faraday rotation glass according to any one of claims 1 to 3, which further contains 1 to 4 mol % of $Al_2O_3$.

5. A Faraday rotation glass according to claim 1, which contains 65 to 70 mol % of $P_2O_5$, 15 to 17.5 mol % of $Tb_2O_3$ and 15 to 20 mol % of $K_2O$.

6. A Faraday rotation glass according to claim 2, wherein the total amount of $Li_2O$, $Na_2O$, $K_2O$ and $Cs_2O$ is 15 to 20 mol %.

7. A Faraday rotation glass according to claim 3, wherein the total amount of $Li_2O$, $Na_2O$, $K_2O$, $Cs_2O$, $MgO$, $CaO$, $SrO$, $BaO$, $PbO$, $WO_3$, $Nb_2O_5$, $SiO_2$, $GeO_2$ and $B_2O_3$ is 15 to 20 mol %.

8. A Faraday rotation glass according to claim 4, wherein $Al_2O_3$ is contained in an amount of 2 to 3 mol %.

9. A Faraday rotation glass according to claim 1, wherein the number of the platinum inclusion having a diameter of not more than 10 μm is approximately not more than 1 per 2 liters of the glass.

* * * * *